(12) United States Patent
Huang et al.

(10) Patent No.: US 12,219,476 B2
(45) Date of Patent: Feb. 4, 2025

(54) LOW POWER WAKE-UP RADIO BEACON SIGNALING

(71) Applicant: Intel Corporation, Santa Clara, CA (US)

(72) Inventors: Po-Kai Huang, San Jose, CA (US); Minyoung Park, Portland, OR (US); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 16/487,564

(22) PCT Filed: Aug. 29, 2017

(86) PCT No.: PCT/US2017/049140
§ 371 (c)(1),
(2) Date: Aug. 21, 2019

(87) PCT Pub. No.: WO2018/156199
PCT Pub. Date: Aug. 30, 2018

(65) Prior Publication Data
US 2020/0059861 A1    Feb. 20, 2020

Related U.S. Application Data

(60) Provisional application No. 62/461,583, filed on Feb. 21, 2017.

(51) Int. Cl.
*H04W 52/02*    (2009.01)
*H04W 56/00*    (2009.01)
(Continued)

(52) U.S. Cl.
CPC ... *H04W 52/0216* (2013.01); *H04W 52/0229* (2013.01); *H04W 56/001* (2013.01);
(Continued)

(58) Field of Classification Search
CPC ......... H04W 52/0216; H04W 52/0229; H04W 52/0235; H04W 56/00; H04W 56/001;
(Continued)

(56) References Cited

U.S. PATENT DOCUMENTS 9,294,997 B1    3/2016    Shukla et al.
11,076,353 B2 *    7/2021    Wang ................ H04W 52/0235
(Continued)

FOREIGN PATENT DOCUMENTS

WO    2018/156199    8/2018

OTHER PUBLICATIONS

International Search Report and Written Opinion for PCT Application No. PCT/US17/41940, mailed Aug. 29, 2017, 10 pages.
(Continued)

*Primary Examiner* — Derrick W Ferris
*Assistant Examiner* — M Mostazir Rahman
(74) *Attorney, Agent, or Firm* — Eversheds Sutherland (US) LLP

(57) ABSTRACT

This disclosure describes systems, methods, and devices related to low power wake-up radio beacon signaling. An access point may determine timing information for the transmission of low power wake up radio beacons and send that timing information to a user device. An access point may then send low power wake up radio beacons based on that timing information to a user device, and a user device may receive the low power wake up radio beacons based on the timing information.

20 Claims, 8 Drawing Sheets

(51) Int. Cl.
   *H04W 72/0446* (2023.01)
   *H04W 72/23* (2023.01)
(52) U.S. Cl.
   CPC ... *H04W 56/0045* (2013.01); *H04W 72/0446* (2013.01); *H04W 72/23* (2023.01)
(58) Field of Classification Search
   CPC ......... H04W 56/0045; H04W 72/0446; H04W 72/1289; Y02D 30/70
   See application file for complete search history.

(56) References Cited

U.S. PATENT DOCUMENTS

| | | | | |
|---|---|---|---|---|
| 2010/0284316 | A1* | 11/2010 | Sampathkumar | ........................... H04W 52/0216 370/311 |
| 2014/0112229 | A1* | 4/2014 | Merlin | .................. H04L 5/0055 370/311 |
| 2014/0119277 | A1* | 5/2014 | Athankutty | ........... H04W 88/06 370/328 |
| 2014/0334365 | A1* | 11/2014 | Jafarian | ............ H04W 52/0216 370/311 |
| 2016/0021612 | A1 | 1/2016 | Matsunaga et al. | |
| 2016/0242115 | A1 | 8/2016 | Jafarian et al. | |
| 2018/0092036 | A1* | 3/2018 | Azizi | .................. H04W 12/069 |
| 2018/0234918 | A1* | 8/2018 | Asterjadhi | ........ H04W 52/0216 |
| 2019/0253972 | A1* | 8/2019 | Park | ........ H04W 52/0235 |
| 2019/0364505 | A1* | 11/2019 | Wang | ................ H04W 52/0235 |
| 2020/0015166 | A1* | 1/2020 | Ahn | ...................... H04W 52/02 |

OTHER PUBLICATIONS

Minyoung Park et al., 'LP-WUR (Low-Power Wake-Up Receiver): Enabling Low-Power and Low-Latency Capability for 802.11', doc.: IEEE 802.11-16/0027r0, slide. 1-21, Jan. 18, 2016. See slides 3-12.

Alfred Asterjadhi et al., 'Scheduled Trigger frames-Follow up', doc.: IEEE 802.11-15/1319r0, slide. 1-18, Nov. 8, 2015 See slides 10-13.

* cited by examiner

LOW POWER WAKE-UP RADIO BEACON SIGNALING

CROSS-REFERENCE TO RELATED APPLICATION(S)

This application is a U.S. National Stage Application under 35 U.S.C. 371 and claims the priority benefit of International Application No. PCT/US2017/049140, filed Aug. 29, 2017, which claims the benefit of U.S. Provisional Application No. 62/461,583, filed Feb. 21, 2017, the disclosures of which

TECHNICAL FIELD

This disclosure generally relates to systems and methods for wireless communications and, more particularly, to low power wake-up radio (LP-WUR) beacon signaling.

BACKGROUND

Advances in wireless communications require using batteries efficiently to allow users to utilize their devices for longer times between recharges or replacement. The exchange of data in wireless communications consumes power and having repeated recharges or installation of dedicated power lines may result in a relatively negative user experience.

DETAILED DESCRIPTION

Figure 1:
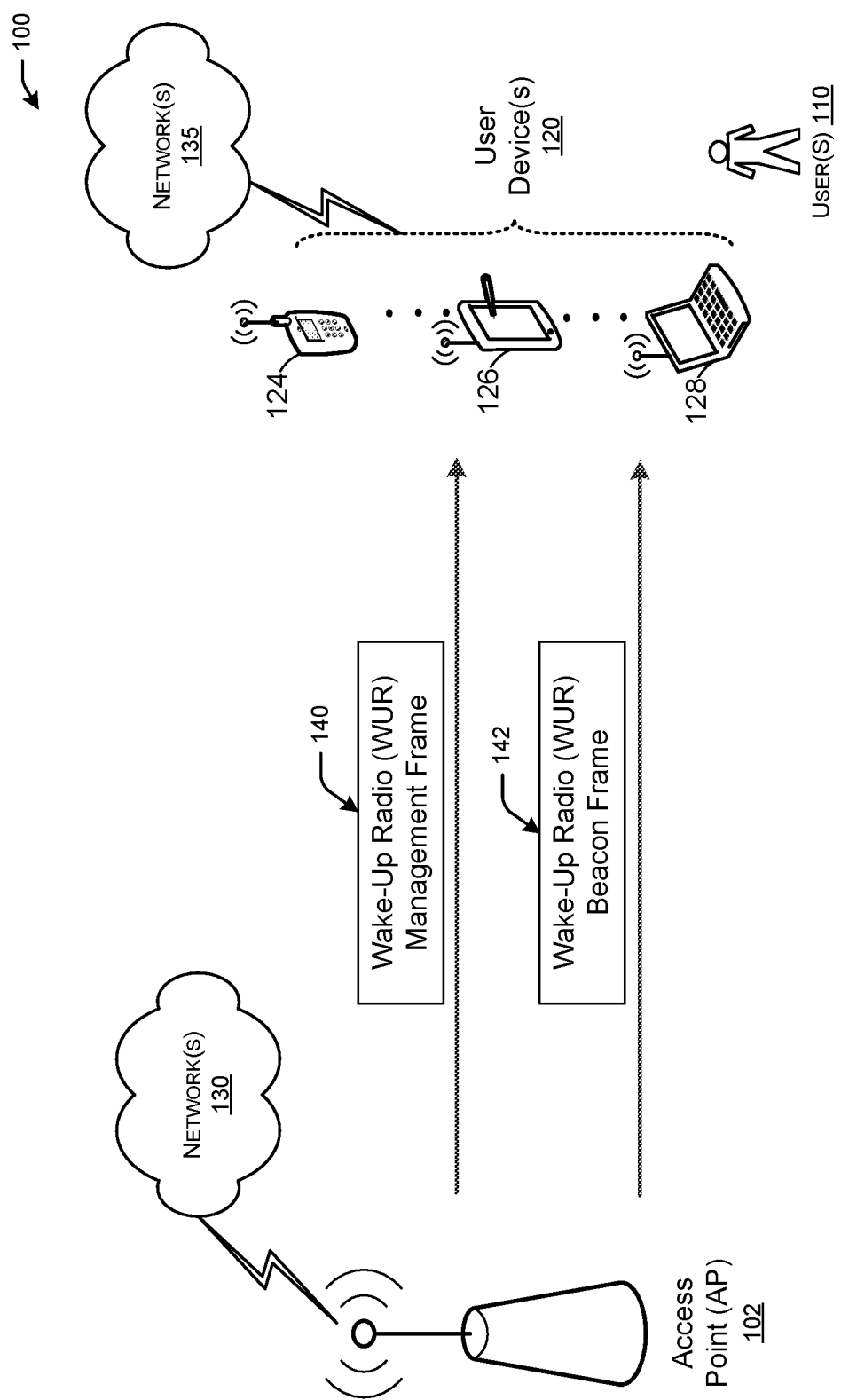
FIG. 1 is a network diagram illustrating an example network environment of LP-WUR beacon signaling, in accordance with one or more example embodiments of the present disclosure.

Example embodiments described herein provide certain systems, methods, and devices for LP-WUR beacon signaling. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Wi-Fi devices consume power during operation. The more power a Wi-Fi device consumes, the shorter its battery life. Battery life is an important performance metric for Wi-Fi devices, and there is a growing need to improve battery life. Various techniques have been proposed to reduce energy consumption by Wi-Fi devices, including low power wake-up radio.

Wi-Fi devices include a main radio transceiver (e.g., an 802.11 transceiver) for wireless communication with other devices. Current Wi-Fi devices keep the main radio transceiver active to receive communication traffic. The main radio transceiver consumes a significant amount of power, and operating the main radio transceiver when communication traffic is low or trivial results in significant power waste. Turning off the main radio transceiver disconnects the Wi-Fi device from the network and puts the Wi-Fi device at risk for missing network communications and the like.

In a Wi-Fi network, an access point (AP) or peer device may periodically transmit a beacon to a Wi-Fi device over main radio, which is received by the Wi-Fi device at a main radio transceiver. A main radio beacon may announce the presence of a Wi-Fi network and may contain network information. More specifically, a main radio beacon frame may include a timestamp to help with timing synchronization, a main radio beacon interval defining main radio beacon transmission times, and device/network capability information such as a service set identifier (SSID) and supported rates. Main radio beacons may serve several purposes, including: passive discovery by Wi-Fi devices, basic service set (BSS) time synchronization, communication of BSS features, updating BSS features, and/or power save management.

Example embodiments of the present disclosure relate to systems, methods, and devices for LP-WUR beacon signaling. In particular, an AP may determine timing information for transmission of LP-WUR beacons and send that timing information to a Wi-Fi device. The timing information may include a WUR beacon offset and a WUR beacon interval, which can be used to determine target wake-up radio beacon transmission times (TWBTTs). An AP may then send LP-WUR beacons based on that timing information to a Wi-Fi device, and a Wi-Fi device may receive the LP-WUR beacons based on the timing information.

In one embodiment, a Wi-Fi device may achieve more efficient power consumption by implementing LP-WUR techniques. LP-WUR is a technique that enables low power operation for a Wi-Fi device. In a LP-WUR system, a Wi-Fi device may have a main radio transceiver (e.g., a legacy IEEE 802.11 transceiver) and a LP-WUR transceiver. The LP-WUR transceiver consumes much less power than the main radio transceiver.

In one embodiment, a Wi-Fi device in a LP-WUR system may operate in either a high power state or a low power state. During high power operation, a Wi-Fi device may keep a LP-WUR transceiver turned off and use a main radio transceiver for network communications. During low power operation, a Wi-Fi device may keep a main radio transceiver turned off and may use a LP-WUR transceiver for network communications. Operating in low power mode may improve power management and power consumption by the Wi-Fi device. When a transceiver is "turned off" or "inactive," the transceiver circuitry may be powered off. When a transceiver is "turned on" or "active," the transceiver circuitry may be powered on.

In one embodiment, a Wi-Fi device may operate in low power mode, and may remain in low power mode until the Wi-Fi device determines to operate in a high power mode. A Wi-Fi device may determine to enter a high power state when, for example, the device receives from an AP or a peer device a WUR packet including instructions to wake up, or a network status change has occurred (e.g., the Wi-Fi device is out of range of the AP or peer device). A Wi-Fi device may enter a high power state by activating the main radio transceiver, which may be used for standard Wi-Fi transmissions.

In one embodiment, in a Wi-Fi network employing LP-WUR techniques, an AP or peer device may transmit one or more LP-WUR beacons to a Wi-Fi device. The LP-WUR beacons may be received by the Wi-Fi device at a LP-WUR transceiver. The LP-WUR beacons may announce the presence of a Wi-Fi network and may contain network information such as timing synchronization information, device/network capability information, and the like. LP-WUR beacons may be sent periodically at a time called target wake-up radio beacon transmission time (TWBTT).

In one embodiment, an AP or a peer device in a Wi-Fi network may send both main radio beacons at target beacon transmission times (TBTTs) and LP-WUR beacons at TWBTTs to one or more Wi-Fi devices. However, the TWBTTs may be different from the TBTTs for at least several reasons. First, it is preferable to avoid overlapping transmission of main radio beacon frames and LP-WUR beacon frames given the overhead introduced by LP-WUR beacon frames. The time interval separating LP-WUR beacon transmissions may be larger than the time interval separating main radio beacon transmissions (e.g., current 802.11 beacon). Second, a Wi-Fi device may only need to receive either a main radio beacon or a LP-WUR beacon, depending on whether the Wi-Fi device is operating in a low power state (e.g., the LP-WUR transceiver is active) or a high power state (e.g., the main radio transceiver is active).

In one embodiment, in a Wi-Fi network, an AP or a peer device may be in communication with a Wi-Fi device. The AP or peer device may determine, based on network parameters or conditions, WUR beacon timing information such as a LP-WUR beacon offset and a LP-WUR beacon interval. The WUR beacon timing information may be used by an AP or peer device and a Wi-Fi device to coordinate the sending and receiving of LP-WUR beacons between the AP or peer device and the Wi-Fi device. The AP or peer device may send one or more LP-WUR management frames carrying the WUR beacon timing information to a Wi-Fi device. The AP or peer device may determine network timing synchronization information, device/network capability information, and the like, and send that information to a Wi-Fi device in one or more LP-WUR beacon frames at target wake-up radio beacon transmission times (TWBTTs) which are defined, at least in part, by the WUR beacon timing information. While the present disclosure may describe sending a LP-WUR beacon frame at a TWBTT in embodiments of the invention, the present disclosure also contemplates scheduling to send a LP-WUR beacon frame at a TWBTT because the actual time to transmit the LP-WUR beacon frame beacon may depend on, among other things, enhanced distributed channel access (EDCA). Thus, when the present disclosure describes sending a LP-WUR beacon frame at a TWBTT in embodiments of the invention, the present disclosure contemplates both scheduling to send a LP-WUR beacon frame at a TWBTT and/or actually sending a LP-WUR beacon frame at a TWBTT.

In one embodiment, a Wi-Fi device may receive one or more LP-WUR management frames carrying WUR beacon timing information. The WUR beacon timing information may be used by an AP or peer device and a Wi-Fi device to coordinate the sending and receiving of LP-WUR beacons between the AP or peer device and the Wi-Fi device. A Wi-Fi device may receive or attempt to receive, using the WUR beacon timing information, one or more LP-WUR beacon frames at target wake-up radio beacon transmission times (TWBTTs) which are defined, at least in part, by the WUR beacon timing information. While the present disclosure may describe receiving a LP-WUR beacon frame at a TWBTT in embodiments of the invention, the present disclosure also contemplates receiving a LP-WUR beacon frame after a TWBTT because the exact time a Wi-Fi device receives a LP-WUR beacon frame may depend on, among other things, enhanced distributed channel access. Thus, when the present disclosure describes receiving a LP-WUR beacon frame at a TWBTT in embodiments of the invention, the present disclosure contemplates both actually receiving a LP-WUR beacon frame at a TWBTT and receiving a LP-WUR beacon frame after a TWBTT. The LP-WUR beacons may announce the presence of a Wi-Fi network and may contain network information such as network timing synchronization information, device/network capability information, and the like. A Wi-Fi device may determine that an AP or peer device is out of range if the Wi-Fi device is unable to receive one or more LP-WUR beacons, and the Wi-Fi device may switch from LP-WUR radio operations to main radio operations in order to connect to a different network. A Wi-Fi device may use information contained in received LP-WUR beacons, which may include network timing synchronization information, device/network capability information, and the like, to communicate in the network.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment of LP-WUR beacon signaling, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 7:
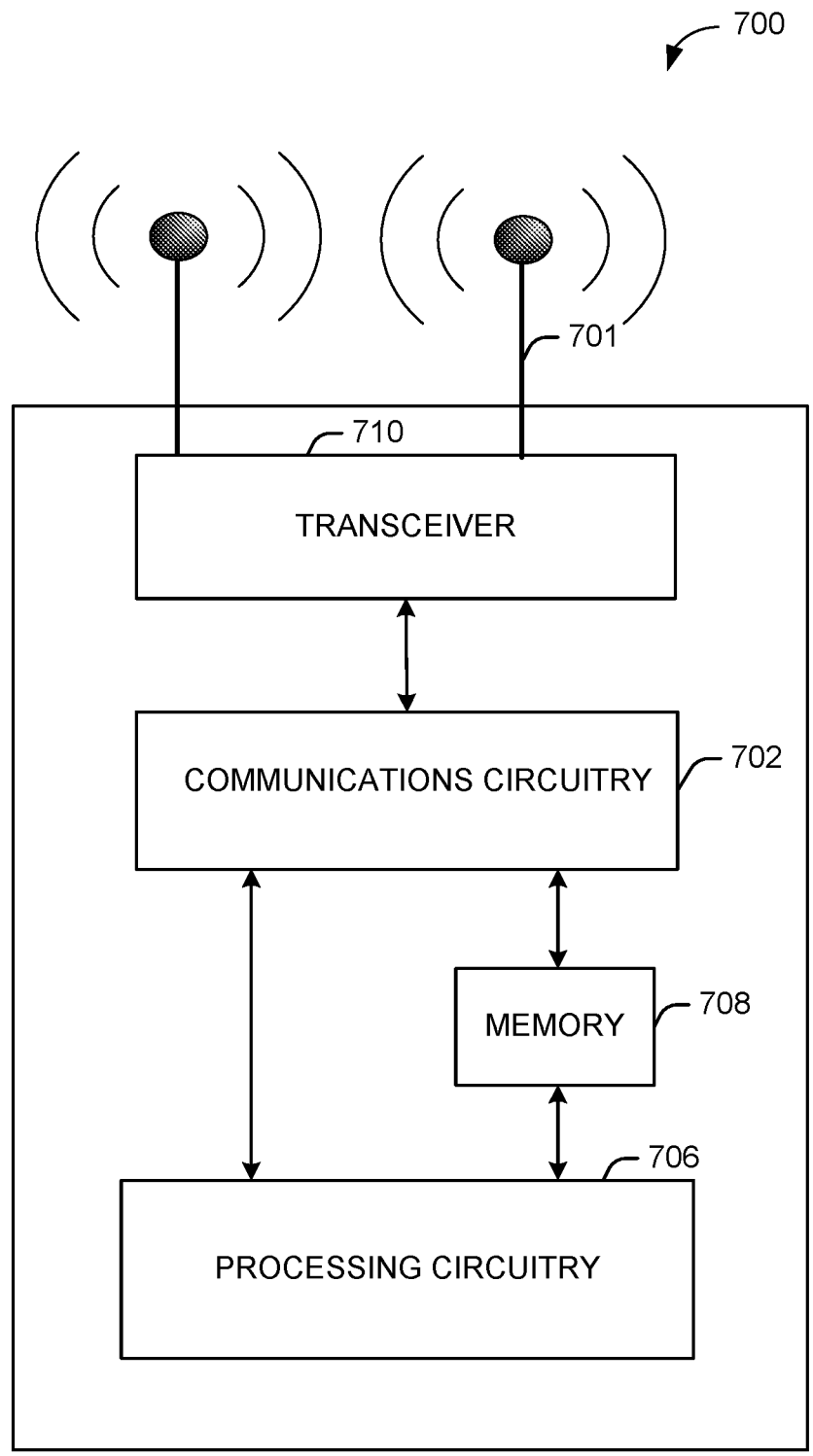
FIG. 7 shows a functional diagram of an exemplary communication station that may be suitable for use as a user device, in accordance with one or more example embodiments of the present disclosure.
Figure 8:
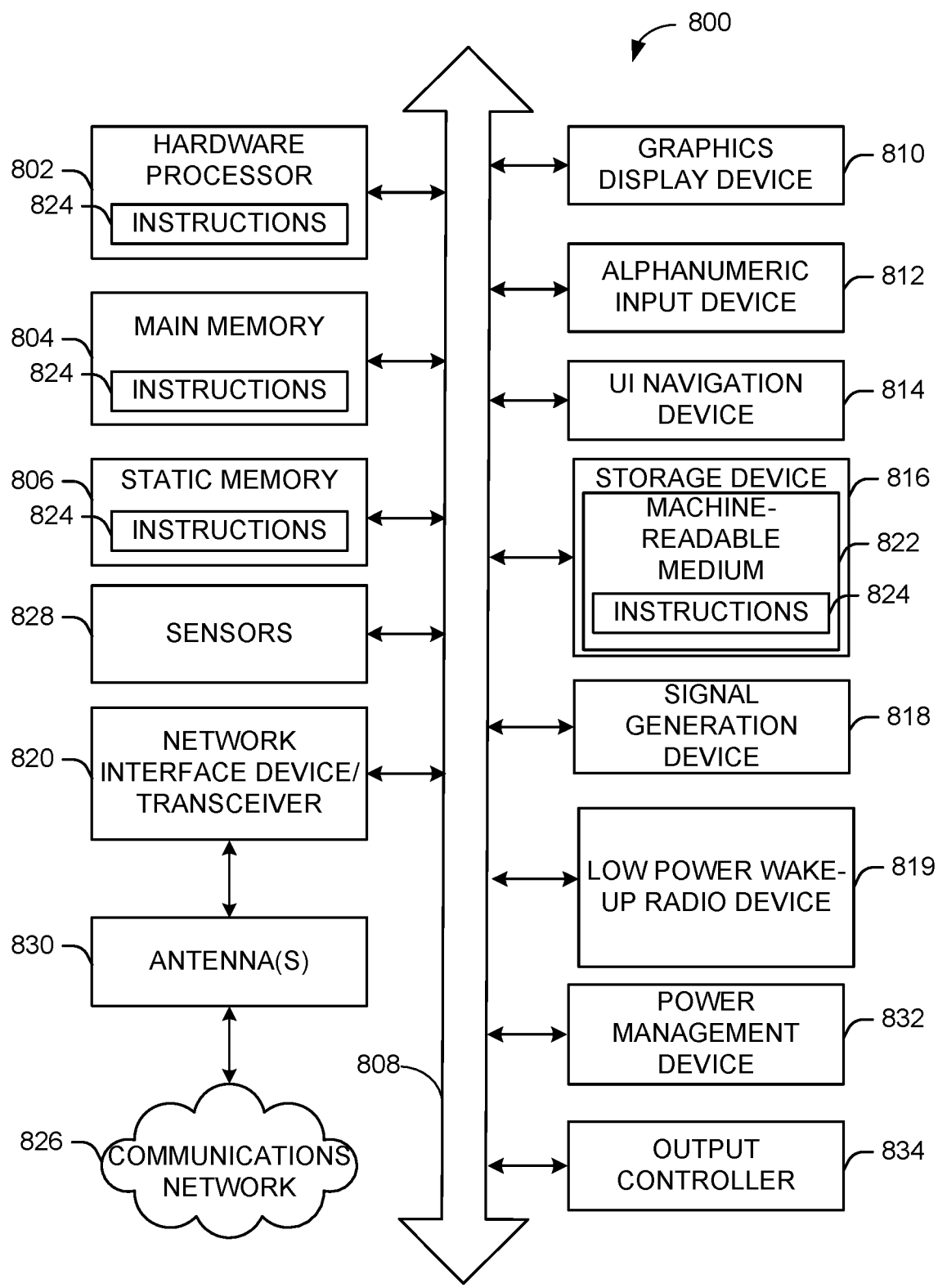
FIG. 8 is a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 7 and/or the example machine/system of FIG. 8.

One or more illustrative user device(s) 120 and/or the AP 102 may be operable by one or more user(s) 110. The user device(s) 120 (e.g., 124, 126, or 128) and/or the AP 102 may include any suitable processor-driven device including, but not limited to, a mobile device or a non-mobile (e.g., a static) device. For example, user device(s) 120 and/or the AP 102 may include a user equipment (UE), a station (STA), an access point (AP), a fine timing measurement (FTM) responder, a personal computer (PC), a wearable wireless device (e.g., a bracelet, a watch, glasses, a ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Any of the user device(s) 120 (e.g., user devices 124, 126, 128), and the AP 102 may be configured to communicate with each other via one or more communications networks 130 and/or 135 wirelessly or wired. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and the AP 102 may include one or more communications antennas. A communications antenna may be any suitable type of antenna corresponding to the communications protocols used by the user device(s) 120 (e.g., user devices 124, 126, and 128), and the AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), and the AP 102 may include any suitable radio and/or transceiver for transmitting and/or receiving radio frequency (RF) signals in the bandwidth and/or channels corresponding to the communications protocols utilized by any of the user device(s) 120 and the AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), 802.11 REVmc D5.0 January, or 60 GHz channels (e.g., 802.11ad, 802.11ay). In some embodiments, non-Wi-Fi protocols may be used for communications between devices, such as Bluetooth, dedicated short-range communication (DSRC), ultra-high frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

With reference to FIG. 1, one or more user devices 120 may desire to operate in an ultra-low power mode to conserve power. During this time, a LP-WUR transceiver of a user device 120 may be active while a main radio transceiver (e.g., an 802.11 transceiver) may be inactive. During low power operation, a user device 120 may receive LP-WUR beacons, and a user device 120 may need to know a TWBTT schedule in order to receive LP-WUR beacons.

In one embodiment, a LP-WUR beacon signaling procedure may facilitate an AP 102 to send a wake up radio (WUR) management frame 140 to a user device 120. The WUR management frame 140 may include TWBTT timing information that indicates when a user device 120 may expect to receive a WUR beacon frame 142. The AP 102 may then send a WUR beacon frame 142 to a user device 120 at a TWBTT, and the user device 120 may receive or attempt to receive the WUR beacon frame 142 at the TWBTT.

In one embodiment, user device 120 may attempt to receive a WUR beacon frame 142 at a scheduled TWBTT, but is unable to do so. User device 120 may determine that an AP 102 is out of range if the user device 120 is unable to receive the WUR beacon frame 142 at a scheduled TWBTT. User device 120 may be operating in low power mode, and user device 120 may switch from LP-WUR radio operations to main radio operations in order to connect to a different network.

In one embodiment, user device 120 may receive a WUR beacon frame 142 at a scheduled TWBTT. The WUR beacon frame 142 may contain network timing synchronization information, device/network capability information, and the like. User device 120 may use the information contained in a received WUR beacon frame 142 to communicate in the network.

Figure 2:
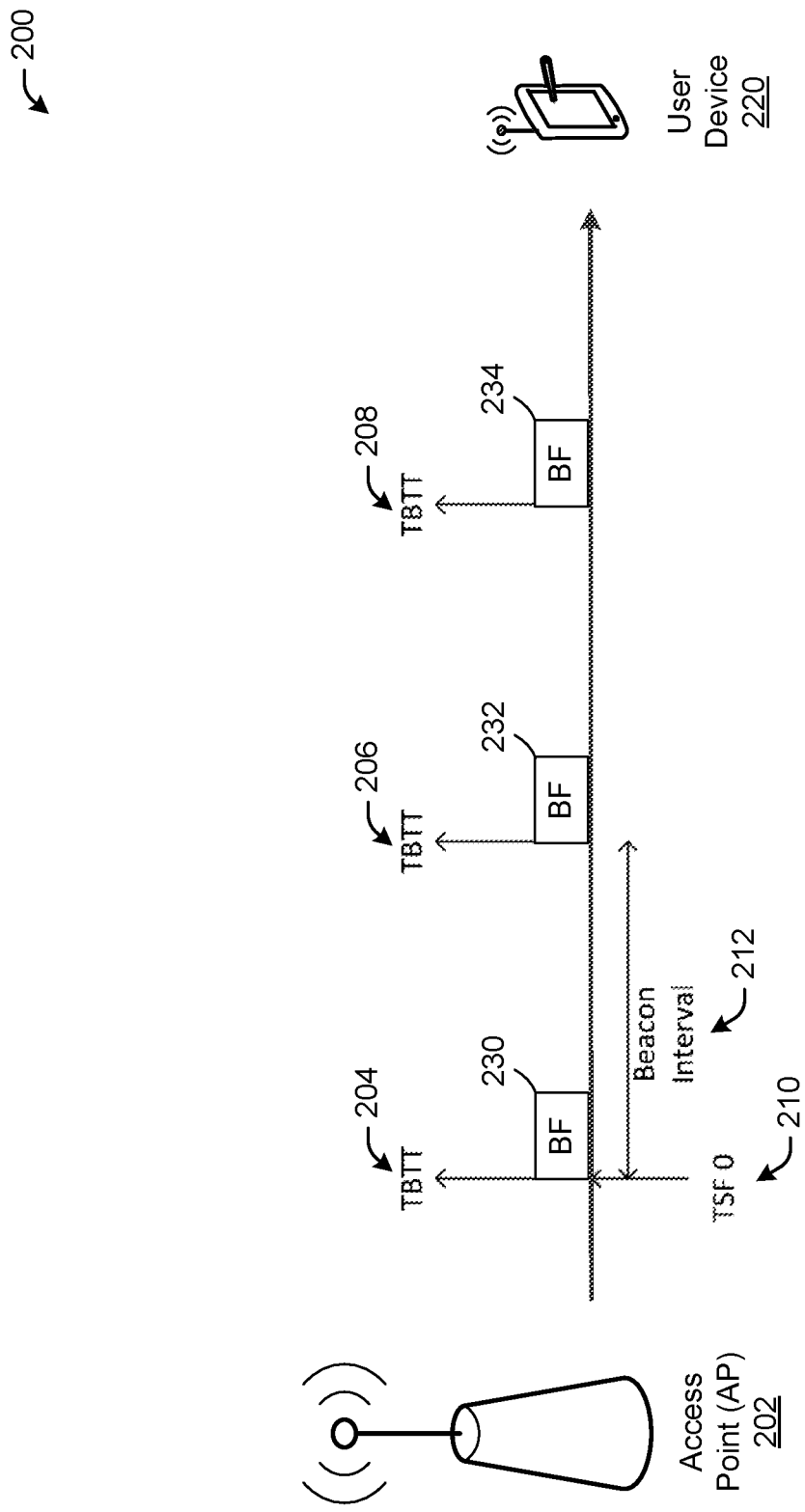
FIG. 2 depicts target beacon transmission times (TBTTs) for main radio beacon transmissions, in accordance with one or more example embodiments of the present disclosure.

FIG. 2 depicts a transmission scheme 200 for sending main radio beacons (e.g., BFs 230, 232, 234) from an AP 202 or peer device to a user device 220 (e.g., a Wi-Fi device).

Referring to FIG. 2, there is shown an AP 202 in communication with a user device 220. In a WLAN network, an AP 202 or peer device may periodically transmit BFs 230, 232, 234 at a series of defined TBTTs 204, 206, 208. The main radio beacons 230, 232, 234 may be received by the Wi-Fi device at a main radio transceiver (e.g., a legacy 802.11 transceiver). Each TBTT 204, 206, 208 may be a time at which each of the BFs 230, 232, 234 is transmitted.

A timing synchronization function (TSF) may be used to keep the timers of all devices in a same basic service set (BSS) synchronized. The timing of main radio beacon transmissions may be based on a timing synchronization function. For example, the values of a TSF timer may be used as reference times for sending and receiving main radio beacon frames 230, 232, 234. FIG. 2 shows values of a timing synchronization function representing time on a horizontal axis.

In a WLAN network, BFs 230, 232, 234 (main radio beacon frames) may be transmitted at a series of TBTTs 204, 206, 208. Time zero of a TSF timer value (e.g., TSF=0) 210 may be a TBTT 204. TBTTs 204, 206, 208 may be separated by a time interval or period designated as beacon interval 212. The beacon interval 212 may be measured in time units (TUs). A TU may be equal to 1024 microseconds. The beacon interval 212 may be a parameter configurable by an AP 202 or a peer device. Typically, a beacon interval 212 is configured to equal 100×TU. In the example of FIG. 2, a first main radio beacon 230 is transmitted at TSF=0, a second main radio beacon 232 is transmitted at TSF=1×beacon interval, and a third main radio beacon 234 is transmitted at TSF=2×beacon interval. It is understood that the above descriptions are for purposes of illustration and are not meant to be limiting.

Figure 3:
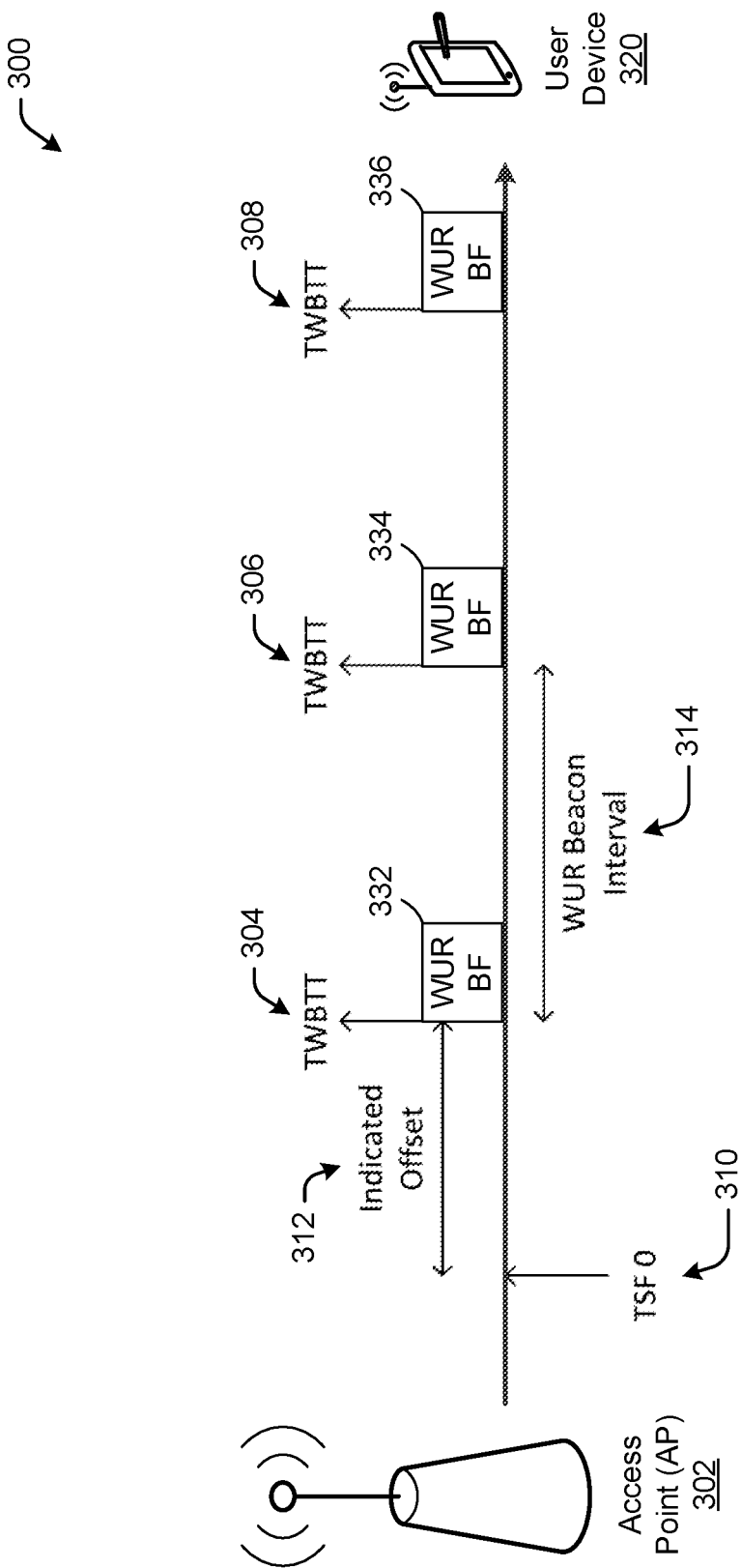
FIG. 3 depicts target wake-up radio beacon transmission times (TWBTTs) for LP-WUR beacon transmissions, in accordance with one or more example embodiments of the present disclosure.

FIG. 3 depicts a transmission scheme 300 for sending LP-WUR beacon frames (e.g., WUR BFs 332, 334, 336) from an AP 302 or peer device to a user device 320 (e.g., a Wi-Fi device) in accordance with one or more example embodiments of the present disclosure.

Referring to FIG. 3, there is shown an AP 302 in communication with a user device 320. The AP 302 may send one or more management frames (e.g., WUR management frames) carrying WUR beacon timing information to user device 320. The AP 302 may also send one or more WUR beacon frames (e.g., WUR beacon frames 332, 334, 336) to the user device 320 at various intervals called target wake-up radio beacon transmission times (TWBTTs) 304, 306, 308. The user device 320 may receive or attempt to receive the WUR beacon frames 332, 334, 336 using the timing information. The WUR BFs 332, 334, 336 may announce the presence of a Wi-Fi network and may contain network information such as timing synchronization information, device/network capability information, and the like. User device 320 may determine that an AP 302 is out of range if the user device 320 is unable to receive one or more LP-WUR beacons (e.g., WUR BFs 332, 334, 336), and the user device 320 may switch from LP-WUR radio operations to main radio operations in order to connect to a different network. User device 320 may use information contained in LP-WUR beacons 332, 334, 336 to communicate in the network.

In one embodiment, an AP 302 or peer device may periodically transmit LP-WUR BFs 332, 334, 336 (e.g., beacon frames) at a series of defined TWBTTs 304, 306, 308. The WUR BFs 332, 334, 336 may be received by the user device 320 at a LP-WUR transceiver. Each TWBTT 304, 306, 308 may be a time at which a WUR BF 332, 334, 336 is transmitted.

In one embodiment, a timing synchronization function (TSF) may be used to keep the timers of all devices in the same basic service set synchronized. The timing of LP-WUR beacon transmissions may be based on a timing synchronization function. For example, the values of a TSF timer may be used as reference times for sending and receiving LP-WUR beacon frames 332, 334, 336. FIG. 3 shows values of a timing synchronization function representing time on a horizontal axis.

In one embodiment, LP-WUR beacons 332, 334, 336 may be transmitted at a series of TWBTTs 304, 306, 308. Time zero of a TSF timer value (e.g., TSF=0) 310 may serve as a reference time for TWBTTs 304, 306, 308. A TWBTT 304 may be a TSF timer value equal to an indicated offset 312 (e.g., TSF=indicated offset), which may be an offset value from TSF=0.

In one embodiment, the indicated offset 312 may be a positive value less than the WUR beacon interval 314. The maximum value of the indicated offset 312 may be less than the WUR beacon interval 314. The indicated offset 312 may be a fixed or predefined value. The indicated offset 312 may be a configurable value, and may be determined by an AP 302 or a peer device. The indicated offset 312 may be selected so that it does not equal a positive integer multiple of a main radio TBTT, which may help prevent any TWBTTs 304, 306, 308 from overlapping any TBTTs. For example, if a main radio beacon interval is 100 TUs, an indicated offset 312 should not equal 100 TUs×N, where N is a positive integer.

In one embodiment, TWBTTs 304, 306, 308 may be separated by a time interval or period designated as WUR beacon interval 314. The WUR beacon interval 314 may be a fixed value. The WUR beacon interval 314 may be a configurable value, and may be determined by an AP 302 or a peer device. The WUR beacon interval 314 may be a positive integer multiple of a main radio beacon interval (e.g., TBTT interval), which can be expressed mathematically as: WUR beacon interval=N×main radio beacon interval, where N≥1. A WUR beacon interval 314 may have a value that, when divided by a main radio beacon interval, results in a remainder of zero. For example, if a main radio beacon interval is 100 TUs, then the WUR beacon interval 314 may be 100 TUs×N, where N is a positive integer. This may help prevent any TWBTTs 304, 306, 308 from overlapping any TBTTs.

In one embodiment, TWBTTs 304, 306, 308 may be determined such that no TWBTTs 304, 306, 308 overlap with any TBTTs. It may be beneficial to not have TBTTs and TWBTTs 304, 306, 308 overlap each other (and therefore not have main radio beacon transmissions and WUR beacon transmissions overlap each other) because a Wi-Fi device may only need to receive either a main radio beacon or a LP-WUR beacon, depending on whether the Wi-Fi device is operating in a low power state (e.g., the LP-WUR transceiver is active) or a high power state (e.g., the main radio transceiver is active). Generally, TWBTTs 304, 306, 308 may be a TSF timer value equal to a non-negative integer multiple of a WUR beacon interval 314 plus a start time from the indicated offset 312 (e.g., TSF=indicated offset+N* WUR beacon interval, where N≥0). In the example of FIG.

3, a first WUR beacon is transmitted at TSF=indicated offset, a second WUR beacon is transmitted at TSF=indicated offset+1×WUR beacon interval, and a third WUR beacon is transmitted at TSF=indicated offset+2×WUR beacon interval. It is understood that the above descriptions are for purposes of illustration and are not meant to be limiting.

In one embodiment, an AP 302 or peer device may indicate TWBTT 304, 306, 308 timing information to a user device 320. The AP 302 may send one or more management frames carrying WUR beacon timing information to user device 320. The timing information may include an indicated offset 312 and a WUR beacon interval 314. The indicated offset 312 and the WUR beacon interval 314 may be measured in TUs. A single TU may be equal to 1024 microseconds. The user device 320 may receive or attempt to receive the WUR beacon frames 332, 334, 336 using the timing information.

Figure 4:
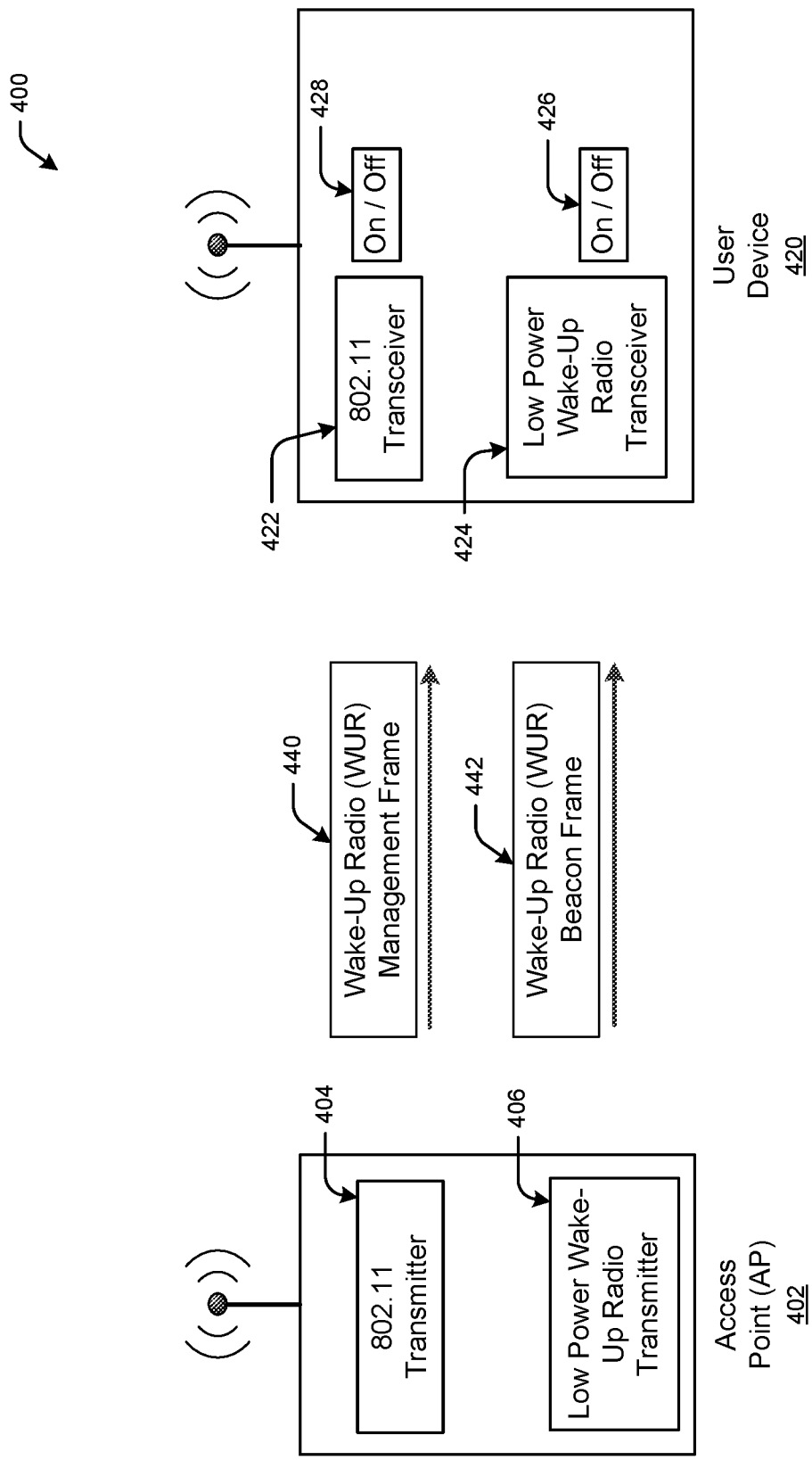
FIG. 4 depicts an illustrative schematic diagram of a LP-WUR beacon signaling procedure, in accordance with one or more example embodiments of the present disclosure.

FIG. 4 depicts an illustrative schematic diagram of a LP-WUR beacon signaling procedure 400, in accordance with one or more example embodiments of the present disclosure.

Referring to FIG. 4, there is shown a transmitting device (e.g., AP 402) and a receiving device (e.g., user device 420). The transmitting device may utilize a transmitter, such as a 802.11 transmitter 404, to send a WUR management frame 440 to an 802.11 transceiver 422 (e.g., main radio transceiver) included in user device 420. Alternatively, the transmitting device may utilize a transmitter, such as a low power wake-up radio transmitter 406, to send a WUR management frame 440 to a LP-WUR transceiver 424 included in user device 420. The WUR management frame 440 may include TWBTT timing information (e.g., indicated offset, WUR beacon interval) indicating when a user device 420 may expect to receive a WUR beacon frame 442. The WUR management frame 440 may be a WUR Action Frame, and the TWBTT timing information may be included in a WUR mode element field of a WUR action frame. After sending a WUR management frame 440, the transmitting device may utilize a LP-WUR transmitter 406 to send a WUR beacon frame 442 at a TWBTT to a LP-WUR transceiver 424 included in user device 420. The user device 420, having knowledge of TWBTT timing information, may receive a WUR beacon frame 442 at a TWBTT.

While AP 402 is shown as having two separate transmitters for main radio and LP-WUR transmissions, a single transmitter (e.g., an 802.11 transmitter) may be configured to send both main radio and LP-WUR transmissions. Transmissions sent over main radio may have more complex modulation schemes whereas transmissions sent over LP-WUR may have simpler modulation schemes. For example, LP-WUR may use a simple modulation scheme such as on-off keying (OOK), amplitude shift keying (ASK), or frequency shift keying (FSK) for signaling.

In one embodiment, the 802.11 transceiver 422 may be configured to receive transmissions over main radio having relatively complex modulation schemes (e.g., typical 802.11 transmissions), and therefore may use hardware and/or software components that cause the device to operate at a relatively high power consumption. Conversely, the LP-WUR transceiver 424 may be configured to receive transmissions over LP-WUR radio having simple modulation schemes (e.g., LP-WUR transmissions), and therefore may use hardware and/or software components that cause the device to operate at a low power consumption.

In one embodiment, a user device 420 may operate in either a high power state or a low power state. During high power operation, a user device 420 may keep a LP-WUR transceiver 424 turned off and use a 802.11 transceiver 422 for network communications. During low power operation, a user device 420 may keep a 802.11 transceiver 422 turned off and use a LP-WUR transceiver 424 for network communications. The 802.11 transceiver 422 and LP-WUR transceiver 424 may be turned on/off 426,428 when the user device 420 determines to switch between high and low power operations. For example, upon determining to enter a high power state (e.g., wake up), user device 420 may cause 802.11 transceiver 422 to wake up (e.g., become active) from its idle state. Around the same time, user device 420 may cause LP-WUR transceiver 424 to power off its circuitry since the 802.11 transceiver 422 is now awake.

Figure 5:
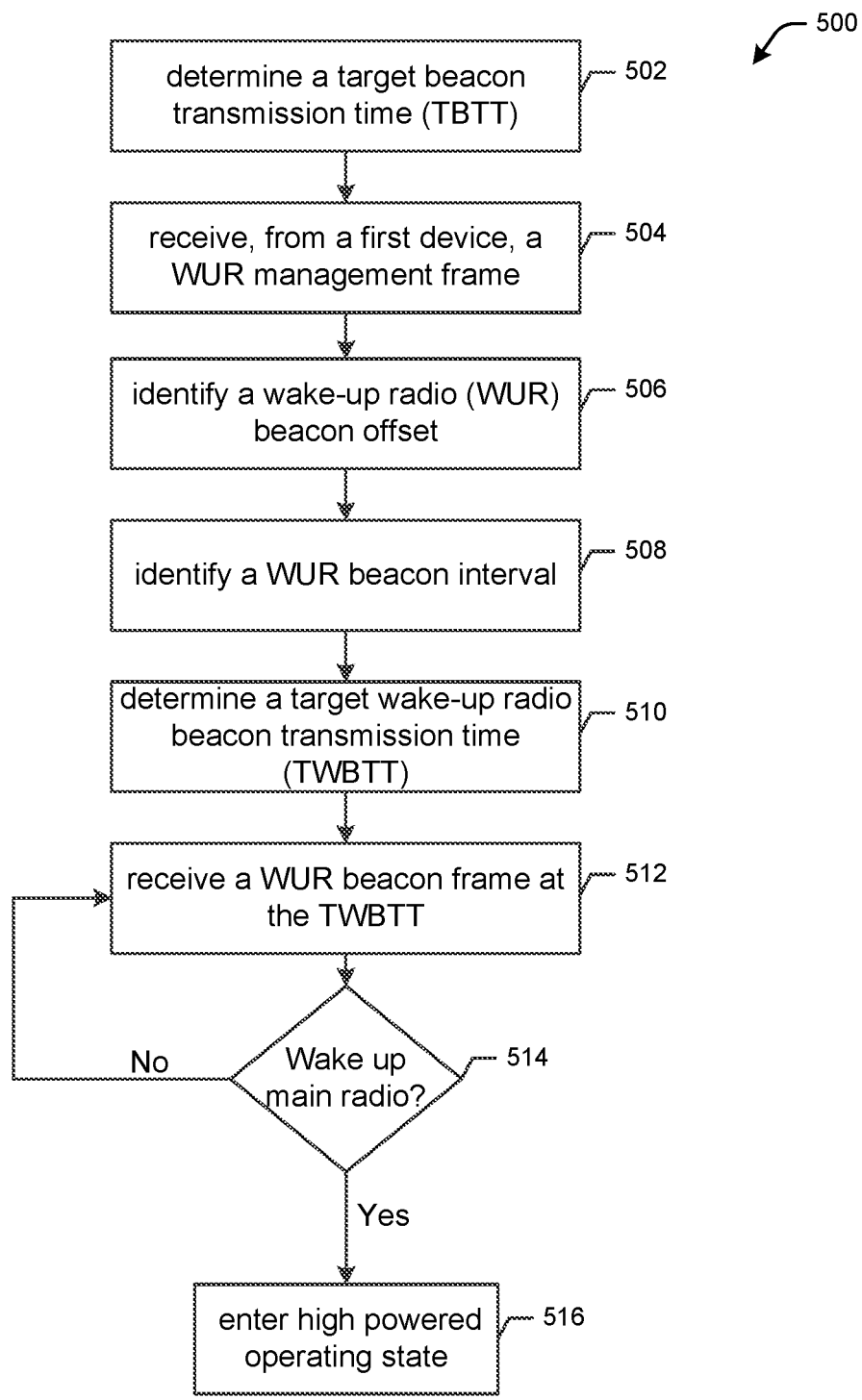
FIG. 5 illustrates a flow diagram of an illustrative process for LP-WUR beacon signaling, in accordance with one or more example embodiments of the present disclosure.

FIG. 5 illustrates a flow diagram of an illustrative process for LP-WUR beacon signaling, in accordance with one or more example embodiments of the present disclosure.

At block 502, a processor on a user device may cause the user device to determine a TBTT schedule (e.g., TBTT timing information). The TBTT schedule may be determined, based at least in part, from a main radio beacon received by an 802.11 transceiver of the user device. The received main radio beacon may include information related to timing synchronization (e.g., a timestamp) and main radio beacon transmission intervals. The processor may cause the user device to determine that a TBTT is time zero of a TSF timer value (e.g., TSF=0). The processor may cause the user device to determine that TBTTs are separated by a time interval or period designated as main radio beacon interval.

At block 504, a processor on the user device may cause the user device to receive, from an AP or peer device, a WUR management frame. The WUR management frame may be received by a main radio transceiver included in the user device. Alternatively, the WUR management frame may be received by a LP-WUR transceiver included in the user device. The WUR management frame may include TWBTT timing information of when a user device may expect to receive a WUR beacon frame. For example, the WUR management frame may include information that indicates a WUR beacon offset and information that indicates a WUR beacon interval.

At block 506, a processor on the user device may cause the user device to identify a WUR beacon offset. The WUR beacon offset may be identified, based at least in part, from information contained in a received WUR management frame. The WUR beacon offset may be used by the user device to help determine when to receive a WUR beacon frame.

At block 508, a processor on the user device may cause the user device to identify a WUR beacon interval. The WUR beacon interval may be identified, based at least in part, from information contained in a received WUR management frame. The WUR beacon interval may be used by the user device to help determine when to receive a WUR beacon frame.

At block 510, a processor on the user device may cause the user device to determine a TWBTT schedule (e.g., TWBTT timing information). The TWBTT schedule may be determined, based at least in part, using an identified WUR beacon offset and an identified WUR beacon interval. The processor may cause the user device to determine that a TWBTT is a TSF timer value equal to the WUR beacon offset (e.g., TSF=WUR beacon offset). The processor may determine that TWBTTs are separated by a time interval or period equal to a WUR beacon interval.

At block 512, a processor on the user device may cause the user device to receive (or attempt to receive), from an AP or peer device, a WUR beacon frame at a TWBTT. The user device may be operating in an ultra-low power mode, wherein a LP-WUR transceiver of the user device is active and an 802.11 transceiver is inactive. The WUR beacon frame may be sent over LP-WUR and received (or attempted to be received) by a LP-WUR transceiver included in the user device.

At block 514, a processor on the user device may cause the user device to determine whether to enter a high power mode and wake up an 802.11 transceiver, or remain in low power mode. A user device may determine to enter a high power state when one or more scheduled WUR beacon frames are not received by the device, indicating that the user device might be out of range of the network or a network status change has occurred. A user device may determine to enter a high power state based, at least in part, on information in a WUR beacon frame (e.g., an express wake-up request, a change in network status/parameters, etc.). A user device may determine to remain in a low power state when one or more WUR beacon frames are received as scheduled and/or information in a received WUR beacon does not indicate a need to wake-up a main radio transceiver (e.g., no express wake up request, no change in network status, etc.).

At block 516, the processor of a user device may cause the device to enter a higher power state (e.g., wake up). The processor may cause the 802.11 transceiver to power on its circuitry, thereby causing the 802.11 transceiver to wake up (e.g., become active) from its idle state. Upon determining to enter a higher power state (e.g., wake up), the user device may send a wake up signal to the 802.11 transceiver to power on its circuitry, thereby causing the 802.11 transceiver to wake up (e.g., become active) from its idle state. The user device may also determine to turn off (e.g., inactivate) the LP-WUR transceiver since the 802.11 transceiver is now awake, and the user device may send a sleep signal to the LP-WUR transceiver to power off its circuitry, thereby causing the LP-WUR transceiver to turn off.

Figure 6:
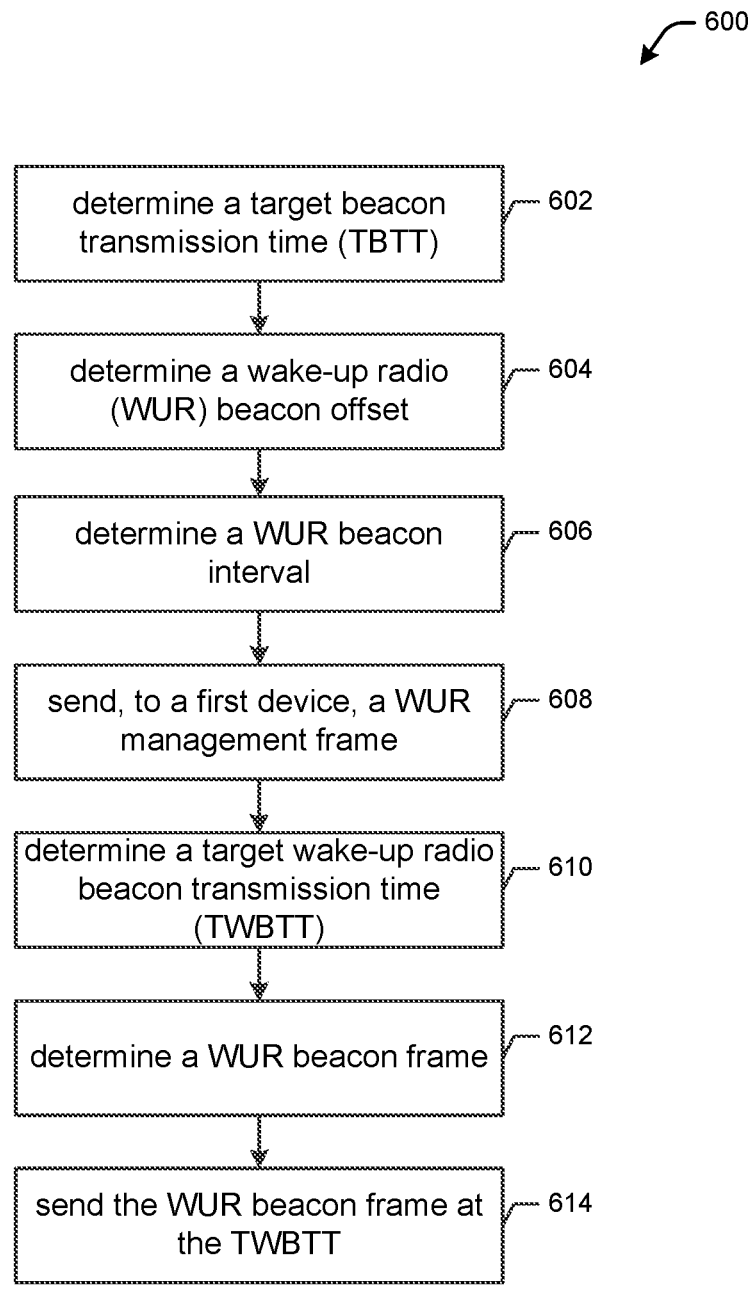
FIG. 6 illustrates a flow diagram of an illustrative process for LP-WUR beacon signaling, in accordance with one or more example embodiments of the present disclosure.

FIG. 6 illustrates a flow diagram of an illustrative process for LP-WUR beacon signaling, in accordance with one or more example embodiments of the present disclosure.

At block 602, a processor of an AP or peer device may cause the AP/peer device to determine a TBTT schedule (e.g., timing information) or information associated therewith. For example, a processor may cause the AP/peer device to determine a beacon interval for main radio beacon transmissions.

At block 604, a processor of an AP or peer device may cause the AP/peer device to determine a WUR beacon offset. WUR beacon transmissions may be based, at least in part, on the WUR beacon offset. The WUR beacon offset may be determined to be a positive value less than a WUR beacon interval.

At block 606, a processor of an AP or peer device may cause the AP/peer device to determine a WUR beacon interval. WUR beacon transmissions may be based, at least in part, on the WUR beacon interval. The WUR beacon interval may be determined to be a positive integer multiple of a main radio beacon interval (e.g., TBTT interval).

At block 608, a processor of an AP or peer device may cause the AP/peer device to send, to a first device, a WUR management frame. The WUR management frame may be sent over main radio for receipt by a main radio transceiver included in a receiving device. Alternatively, the WUR management frame may be sent over LP-WUR for receipt by a LP-WUR transceiver included in a receiving device. The WUR management frame may include TWBTT timing information of when the AP/peer device will send WUR beacons. For example, the WUR management frame may include information that indicates a WUR beacon offset and information that indicates a WUR beacon transmission interval.

At block 610, a processor of an AP or peer device may cause the AP/peer device to determine a TWBTT schedule (e.g., TWBTT timing information). The TWBTT schedule may be determined, at least in part, using a WUR beacon offset and a WUR beacon interval. The processor of an AP or peer device may cause the AP/peer device to determine that a TWBTT is a TSF timer value equal to a non-negative integer multiple of the WUR beacon interval plus a start time from the WUR beacon offset (e.g., TSF=WUR beacon offset+N* WUR beacon interval, where N≥0).

At block 612, a processor of an AP or peer device may cause the AP/peer device to determine a WUR beacon frame. The WUR beacon frame may include timing synchronization information, device/network capability information, and other information.

At block 614, a processor of an AP or peer device may cause the AP/peer device to send a WUR beacon frame at a TWBTT. The WUR beacon frame may be sent over LP-WUR.

FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or a user device 120 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an AP, an access terminal, or other personal communication system (PCS) device.

The communication station 700 may include communications circuitry 702 and a transceiver 710 for transmitting and receiving signals to and from other communication stations using one or more antennas 701. The transceiver 710 may be a device comprising both a transmitter and a receiver that are combined and share common circuitry (e.g., communication circuitry 702). The communication circuitry 702 may include amplifiers, filters, mixers, analog to digital and/or digital to analog converters. The transceiver 710 may transmit and receive analog or digital signals. The transceiver 710 may allow reception of signals during transmission periods. This mode is known as full-duplex, and may require the transmitter and receiver to operate on different frequencies to minimize interference between the transmitted signal and the received signal. The transceiver 710 may operate in a half-duplex mode, where the transceiver 710 may transmit or receive signals in one direction at a time.

The communications circuitry 702 may include circuitry that may operate the physical layer (PHY) communications and/or media access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 5 and 6.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI)

navigation device 814 (e.g., a mouse). In an example, the graphics display device 810, the alphanumeric input device 812, and the UI navigation device 814 may be a touch screen display. The machine 800 may additionally include a storage device (e.g., drive unit) 816, a signal generation device 818 (e.g., a speaker), a LP-WUR device 819, a network interface device/transceiver 820 coupled to antenna(s) 830, and one or more sensors 828, such as a global positioning system (GPS) sensor, a compass, an accelerometer, or other sensor. The network interface device/transceiver 820 may include an 802.11 radio/transceiver. The machine 800 may include an output controller 834, such as a serial connection (e.g., universal serial bus (USB), parallel, or other wired or wireless connection (e.g., infrared (IR), near field communication (NFC), etc.) to communicate with or control one or more peripheral devices (e.g., a printer, a card reader, etc.)).

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The LP-WUR device 819 may carry out or perform any of the operations and processes (e.g., processes 500 and 600) described and shown above. For example, the LP-WUR device 819 may be configured to determine timing information, such as a WUR beacon offset and a WUR beacon interval, for LP-WUR beacon transmissions, and send that timing information to a Wi-Fi device in a LP-WUR management frame. The LP-WUR device 819 may be configured to determine timing synchronization information, device/network capability information, and other information, and send that information to a Wi-Fi device in a LP-WUR beacon frame. The LP-WUR device 819 may be configured to send the LP-WUR beacon frame at a target wake-up radio beacon transmission time (TWBTT) which is defined, at least in part, by the timing information.

The LP-WUR device 819 may be configured to receive from an AP a LP-WUR management frame containing timing information, such as a WUR beacon offset and a WUR beacon interval, for LP-WUR beacon transmissions. The LP-WUR device 819 may be configured to receive from an AP a LP-WUR beacon frame containing timing synchronization information, device/network capability information, and other information. The LP-WUR device 819 may be configured to receive the LP-WUR beacon frame at a target wake-up radio beacon transmission time (TWBTT) which is defined, at least in part, by the timing information.

It is understood that the above are only a subset of what the LP-WUR device 819 may be configured to perform and that other functions included throughout this disclosure may also be performed by the LP-WUR device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random access memory (RAM), magnetic disk storage media, optical storage media, a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone service (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes (e.g., processes 500 and 600) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device," and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one-way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

According to example embodiments of the disclosure, there may be a device. The device may include memory and processing circuitry configured to determine a first synchronization time associated with a timing synchronization function and a target beacon transmission time (TBTT) interval; determine a wake-up radio (WUR) beacon time offset from the first synchronization time; determine a WUR beacon interval associated with a target wake-up radio beacon transmission time (TWBTT); and cause to send, to a first device, a WUR management frame comprising the WUR beacon time offset and the WUR beacon interval.

The implementations may include one or more of the following features. The WUR beacon time offset may be a positive value less than the WUR beacon interval. The WUR beacon interval may be a positive integer multiple of the TBTT interval. The memory and processing circuitry may be further configured to determine the TWBTT is equal to a non-negative integer multiple of the WUR beacon interval plus a start time from the WUR beacon time offset. The TWBTT may not overlap with any TBTTs. The memory and processing circuitry may be further configured to determine a WUR beacon frame and schedule to send the WUR beacon frame at the TWBTT. The memory and processing circuitry may be further configured to send the WUR management frame to a high power main radio receiver. The device may further include at least one transceiver. The device may further include one or more antennas coupled to the transceiver.

According to example embodiments of the disclosure, there may be a method. The method may include determining a first synchronization time associated with a timing synchronization function and a target beacon transmission time (TBTT) interval, determining a wake-up radio (WUR) beacon time offset from the first synchronization time, determining a WUR beacon interval associated with a target wake-up radio beacon transmission time (TWBTT), and causing to send, to a first device, a WUR management frame comprising the WUR beacon time offset and the WUR beacon interval.

The implementations may include one or more of the following features. The WUR beacon time offset may be a positive value less than the WUR beacon interval. The WUR beacon interval may be a positive integer multiple of the TBTT interval. The method may further comprise determining the TWBTT is equal to a non-negative integer multiple of the WUR beacon interval plus a start time from the WUR beacon time offset. The TWBTT may not overlap with any TBTTs. The method may further comprise determining a WUR beacon frame, and scheduling to send the WUR beacon frame at the TWBTT. The method may further comprise sending the WUR beacon frame to a low power wake-up radio receiver. The method may further comprise sending the WUR management frame to a high power main radio receiver.

According to example embodiments of the disclosure, there may be a non-transitory computer-readable medium storing computer-executable instructions which, when executed by a processor, cause the processor to perform operations. The operations may include determining a first synchronization time associated with a timing synchronization function and a target beacon transmission time (TBTT) interval, determining a wake-up radio (WUR) beacon time offset from the first synchronization time, determining a WUR beacon interval associated with a target wake-up radio beacon transmission time (TWBTT), and causing to send, to a first device, a WUR management frame comprising the WUR beacon time offset and the WUR beacon interval.

The implementations may include one or more of the following features. The WUR beacon time offset may be a positive value less than the WUR beacon interval. The WUR beacon interval may be a positive integer multiple of the TBTT interval. The operations may further comprise determining the TWBTT is equal to a non-negative integer multiple of the WUR beacon interval plus a start time from the WUR beacon time offset. The TWBTT may not overlap with any TBTTs. The operations may further comprise determining a WUR beacon frame; and scheduling to send the WUR beacon frame at the TWBTT. The operations may further comprise sending the WUR beacon frame to a low power wake-up radio receiver. The operations may further comprise sending the WUR management frame to a high power main radio receiver.

According to embodiments of the disclosure, there may be an apparatus. The apparatus may comprise means for determining a first synchronization time associated with a timing synchronization function and a target beacon transmission time (TBTT) interval, means for determining a wake-up radio (WUR) beacon time offset from the first synchronization time, means for determining a WUR beacon interval associated with a target wake-up radio beacon transmission time (TWBTT), and means for causing to send, to a first device, a WUR management frame comprising the WUR beacon time offset and the WUR beacon interval.

The implementations may include one or more of the following features. The WUR beacon time offset may be a positive value less than the WUR beacon interval. The WUR beacon interval may be a positive integer multiple of the TBTT interval. The apparatus may further comprise means for determining the TWBTT is equal to a non-negative integer multiple of the WUR beacon interval plus a start time from the WUR beacon time offset. The TWBTT may not overlap with any TBTTs. The apparatus may further comprise means for determining a WUR beacon frame, and means for scheduling to send the WUR beacon frame at the TWBTT. The apparatus may further comprise means for sending the WUR beacon frame to a low power wake-up radio receiver. The apparatus may further comprise means for sending the WUR management frame to a high power main radio receiver.

According to example embodiments of the disclosure, there may be a device. The device may include memory and processing circuitry configured to identify a first synchronization time associated with a timing synchronization function and a target beacon transmission time (TBTT) interval, cause to receive a wake-up radio (WUR) management frame comprising a WUR beacon time offset from the first synchronization time and a WUR beacon interval associated with a target wake-up radio beacon transmission time (TWBTT), and cause to receive a WUR beacon frame after the TWBTT, wherein the TWBTT is equal to a non-negative integer multiple of the WUR beacon interval plus a start time from the WUR beacon time offset.

The implementations may include one or more of the following features. The memory and processing circuitry may be further configured to cause the device to enter a high power operating state when the WUR beacon frame is not received at the TWBTT. Causing the device to enter the high power operating state may comprise activating a high power main radio receiver of the device. The memory and processing circuitry may be further configured to cause the device to enter a high power operating state based, at least in part, on data in the WUR beacon frame. The WUR beacon time offset may be a positive value less than the WUR beacon interval. The WUR beacon interval may be a positive integer multiple of the TBTT interval. The WUR beacon frame may be received at a low power wake-up radio receiver. The device may further include at least one transceiver. The device may further include one or more antennas coupled to the transceiver.

According to example embodiments of the disclosure, there may be a method. The method may comprise, identifying a first synchronization time associated with a timing synchronization function and a target beacon transmission time (TBTT) interval, causing to receive a wake-up radio (WUR) management frame comprising a WUR beacon time offset from the first synchronization time and a WUR beacon interval associated with a target wake-up radio beacon transmission time (TWBTT), and causing to receive a WUR beacon frame after the TWBTT, wherein the TWBTT is equal to a non-negative integer multiple of the WUR beacon interval plus a start time from the WUR beacon time offset.

The implementations may include one or more of the following features. The method may further comprise causing the device to enter a high power operating state when the WUR beacon frame is not received at the TWBTT. Causing the device to enter the high power operating state may comprise activating a high power main radio receiver of the device. The method may further comprise causing the device to enter a high power operating state based, at least in part, on data in the WUR beacon frame. The WUR beacon time offset may be a positive value less than the WUR beacon interval. The WUR beacon interval may be a positive integer multiple of the TBTT interval. The WUR beacon frame may be received at a low power wake-up radio receiver.

According to example embodiments of the disclosure, there may be a non-transitory computer-readable medium storing computer-executable instructions which, when executed by a processor, cause the processor to perform operations. The operation may include identifying a first synchronization time associated with a timing synchronization function and a target beacon transmission time (TBTT) interval, causing to receive a wake-up radio (WUR) management frame comprising a WUR beacon time offset from the first synchronization time and a WUR beacon interval associated with a target wake-up radio beacon transmission time (TWBTT), and causing to receive a WUR beacon frame after the TWBTT, wherein the TWBTT is equal to a non-negative integer multiple of the WUR beacon interval plus a start time from the WUR beacon time offset.

The implementations may include one or more of the following features. The operations may further comprise causing the device to enter a high power operating state when the WUR beacon frame is not received at the TWBTT. Causing the device to enter the high power operating state comprises activating a high power main radio receiver of the device. The operations may further comprise causing the device to enter a high power operating state based, at least in part, on data in the WUR beacon frame. The WUR beacon time offset may be a positive value less than the WUR beacon interval. The WUR beacon interval may be a positive integer multiple of the TBTT interval. The WUR beacon frame may be received at a low power wake-up radio receiver.

According to embodiments of the disclosure, there may be an apparatus. The apparatus may comprise means for identifying a first synchronization time associated with a timing synchronization function and a target beacon transmission time (TBTT) interval, means for causing to receive a wake-up radio (WUR) management frame comprising a WUR beacon time offset from the first synchronization time and a WUR beacon interval associated with a target wake-up radio beacon transmission time (TWBTT), and means for causing to receive a WUR beacon frame after the TWBTT, wherein the TWBTT is equal to a non-negative integer multiple of the WUR beacon interval plus a start time from the WUR beacon time offset.

The implementations may include one or more of the following features. The apparatus may further comprise means for causing the device to enter a high power operating state when the WUR beacon frame is not received at the TWBTT. Means for causing the device to enter the high power operating state may comprise activating a high power main radio receiver of the device. The apparatus may further comprise means for causing the device to enter a high power operating state based, at least in part, on data in the WUR beacon frame. The WUR beacon time offset may be a positive value less than the WUR beacon interval. The WUR beacon interval may be a positive integer multiple of the TBTT interval. The WUR beacon frame may be received at a low power wake-up radio receiver.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An access point device for wake-up radio (WUR) signaling, the access point device comprising memory and processing circuitry configured to:
   determine a first time when the access point device is to send a first beacon to a first station device, wherein the first time indicates a beginning of a first beacon interval during which the first station device is in an awake state, the first beacon interval ending when the access point device is to send a second beacon to the first station device;

determine an offset time, based on the first time and the number of time units (TUs) between consecutive target WUR beacon transmission times, when the access point device is to send a first WUR beacon to the first station device, wherein the offset time indicates a beginning of a second beacon interval during which the first station device is in a sleep state that uses WUR transmissions, the second beacon interval ending when the access point device is to send a second WUR beacon to the first station device, wherein the first station device is to enter the sleep state at the offset time;

generate an offset that indicates a time difference between a first target WUR beacon transmission time (TWBTT) and timing synchronization function (TSF) 0, wherein the offset is selected to not equal a positive integer multiple of a main radio target beacon transmission time (TBTT), to prevent overlap of WUR and main radio beacons; and cause to send, to the first station device, the first WUR beacon, wherein the WUR beacon comprises synchronization information, including timing synchronization function values, that enable the first station device to synchronize its wake-up radio listen schedule.

2. The access point device of claim 1, the frame further comprising an indication of the second beacon interval.

3. The access point device of claim 1, wherein the frame is a management frame.

4. The access point device of claim 1, wherein the offset time is offset from the first time by a time value greater than zero.

5. The access point device of claim 1, wherein the processing circuitry is further configured to cause to send the first WUR beacon to the first station device at the offset time.

6. The access point device of claim 5, wherein the processing circuitry is further configured to cause to send the second WUR beacon to the first station device at a second time, the second time associated with the second beacon interval.

7. The access point device of claim 1, further comprising at least one transceiver configured to send or receive one or more signals, the one or more signals comprising at least one of the frame or the first WUR beacon.

8. The access point device of claim 7, further comprising at least one antenna coupled to the at least one transceiver.

9. A method comprising:

determining, by processing circuitry of an access point, a first time when the access point is to send a first beacon to a station device, wherein the first time indicates a beginning of a first beacon interval during which the station device is in an awake state, the first beacon interval ending when the access point is to send a second beacon to the station device;

determining an offset time, based on the first time and the number of time units (TUs) between consecutive target WUR beacon transmission times, when the access point is to send a first WUR beacon to the station device, wherein the offset time indicates a beginning of a second beacon interval during which the station device is in a sleep state that uses WUR transmissions, the second beacon interval ending when the access point is to send a second WUR beacon to the station device, wherein the station device is to enter the sleep state at the offset time;

generate an offset that indicates a time difference between a first target WUR beacon transmission time (TWBTT) and timing synchronization function (TSF) 0, wherein the offset is selected to not equal a positive integer multiple of a main radio target beacon transmission time (TBTT), to prevent overlap of WUR and main radio beacons; and causing to send, to the station device, the first WUR beacon, wherein the WUR beacon comprises synchronization information, including timing synchronization function values, that enable the first station device to synchronize its wake-up radio listen schedule.

10. The method of claim 9, the frame further comprising an indication of the second beacon interval.

11. The method of claim 9, wherein the frame is a management frame.

12. The method of claim 9, wherein the offset time is offset from the first time by a time value greater than zero.

13. The method of claim 9, further comprising causing to send the first WUR beacon to the station device at the offset time.

14. The method of claim 9, further comprising causing to send the second WUR beacon to the station device at a second time, the second time associated with the second beacon interval.

15. A non-transitory computer-readable medium storing computer-executable instructions which, when executed by a processor, cause the processor to perform operations comprising:

determining, by an access point, a first time when the access point is to send a first beacon to a station device, wherein the first time indicates a beginning of a first beacon interval during which the station device is in an awake state, the first beacon interval ending when the access point is to send a second beacon to the station device;

determining, by the access point, based on the first time and the number of time units (TUs) between consecutive target WUR beacon transmission times, an offset time when the access point is to send a first WUR beacon to the station device, wherein the offset time indicates a beginning of a second beacon interval during which the station device is in a sleep state that uses WUR transmissions, the second beacon interval ending when the access point is to send a second WUR beacon to the station device, wherein the station device is to enter the sleep state at the offset time;

generate an offset that indicates a time difference between a first target WUR beacon transmission time (TWBTT) and timing synchronization function (TSF) 0, wherein the offset is selected to not equal a positive integer multiple of a main radio target beacon transmission time (TBTT), to prevent overlap of WUR and main radio beacons; and causing to send, by the access point, to the station device, the first WUR beacon, wherein the WUR beacon comprises synchronization information, including timing synchronization function values, that enable the first station device to synchronize its wake-up radio listen schedule.

16. The non-transitory computer-readable medium of claim 15, the frame further comprising an indication of the second beacon interval.

17. The non-transitory computer-readable medium of claim 15, wherein the frame is a management frame.

18. The non-transitory computer-readable medium of claim 15, wherein the offset time is offset from the first time by a time value greater than zero.

19. The non-transitory computer-readable medium of claim 15, the operations further comprising causing to send the first WUR beacon to the station device at the offset time.

20. The non-transitory computer-readable medium of claim 15, the operations further comprising causing to send the second WUR beacon to the station device at a second time, the second time associated with the second beacon interval.

* * * * *